(12) United States Patent
Brakelmann et al.

(10) Patent No.: US 7,088,064 B2
(45) Date of Patent: Aug. 8, 2006

(54) METHOD FOR THE ORIENTATION OF A SPINDLE AND NUMERICAL CONTROL DEVICE OF A MACHINE TOOL EMBODIED FOR THE METHOD FOR THE ORIENTATION OF THE SPINDLE

(75) Inventors: Michael Brakelmann, Wedemark (DE); Matthias Fauser, Bugwedel (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 136 days.

(21) Appl. No.: 10/776,464

(22) Filed: Feb. 10, 2004

(65) Prior Publication Data

US 2004/0198574 A1 Oct. 7, 2004

(30) Foreign Application Priority Data

Feb. 11, 2003 (DE) ................................ 103 05 396

(51) Int. Cl.
*G05B 11/18* (2006.01)
*G05B 13/00* (2006.01)

(52) U.S. Cl. .................. 318/364; 318/365; 318/366; 318/571; 409/80

(58) Field of Classification Search ............ 409/79–80, 409/131; 318/364–365, 366, 571, 572
See application file for complete search history.

(56) References Cited

U.S. PATENT DOCUMENTS

| 4,647,826 | A | * | 3/1987 | Ota ............................. 318/561 |
| 4,703,262 | A | * | 10/1987 | Fujioka et al. ......... 324/207.22 |
| 5,030,900 | A | * | 7/1991 | Kono et al. .................. 318/592 |
| 5,519,297 | A | | 5/1996 | Kono et al. |

FOREIGN PATENT DOCUMENTS

| EP | 0 580 866 B1 | 4/1997 |
| JP | 63-273114 A | * 11/1988 |

* cited by examiner

*Primary Examiner*—Erica Cadugan
(74) *Attorney, Agent, or Firm*—Brinks Hofer Gilson & Lione

(57) ABSTRACT

A method for the orientation of a spindle of a numerically controlled and rapidly rotating spindle by which the spindle is brought from an initial rotational speed into a predetermined position of rest. The method includes performing a first phase of orientation of the spindle by braking the spindle to a threshold rotational speed, wherein during the braking a switching over to a position controller is prepared, the switching over is performed at a switching time during a transition from the first phase of orientation to a second phase of orientation, the switching over is continuous in regard to position and/or rotational speed, and wherein a rotational speed of the spindle drops strictly monotonically. The method further includes performing the second phase of orientation of three spindle so that a predetermined position of rest for the spindle is controlled by the position controller from the switching time until the predetermined position of rest of the spindle has been reached in the second phase at a position time.

13 Claims, 2 Drawing Sheets

METHOD FOR THE ORIENTATION OF A SPINDLE AND NUMERICAL CONTROL DEVICE OF A MACHINE TOOL EMBODIED FOR THE METHOD FOR THE ORIENTATION OF THE SPINDLE

Applicants claim, under 35 U.S.C. §119, the benefit of priority of the filing date of Feb. 11, 2003 of a German patent application, copy attached, Serial Number 103 05 396.4, filed on the aforementioned date, the entire contents of which is incorporated herein by reference.

BACKGROUND OF THE INVENTION

1. Field of the Invention

The present invention relates to a method for the orientation of a spindle of a numerically controlled and rapidly rotating spindle, by which the spindle is brought from an initial rotational speed into a predetermined position of rest in that in a first phase the spindle is braked at a first braking rate function to a threshold rotational speed and in a second phase the defined position of rest is controlled by position regulation. The present invention further relates to a numerical control device of a machine tool embodied for the method of the present invention.

2. Discussion of Related Art

Such a method makes it possible to bring a rapidly rotating spindle, for example that of a machine tool, to a stop in a defined position in a very short time, for example for the purpose of changing a tool on the spindle.

Spindles operating at increasingly higher numbers of revolution are used in modern machine tools. Cutter heads are used for so-called high speed cutting which are operated at 60,000 revolutions per minute, for example. In this way the processing speeds can be increased in comparison with slower tool spindles, and the processing times can be reduced. Because of this the productivity of a machine tool is clearly increased.

In the course of processing it is necessary time and again to brake the spindles from their high rotational speed and to bring them to a stop in a defined angular position or location. This can be necessary in case of a tool change, for example, if a tool can only be used in a defined orientation with respect to the spindle.

In a numerically controlled machine tool the movement of the spindle shaft is monitored by a numerical control device. By a cascading regulating structure consisting of a position controller, a rotational speed controller and current or torque regulators it is possible, at least at low numbers of revolutions, to control the spindle very accurately by presetting the respectively desired angular position in the position controller as the nominal position value. However, at very high numbers of revolutions a position regulation can no longer take place for reasons which will be explained in detail farther down below. It is therefore customary to bring rapidly rotating spindles to the desired rotational speed by a rotational speed controller. For this purpose the position controller is deactivated and a nominal rotational speed value is provided directly to the rotational speed controller.

If processing of a workpiece requires the frequent stopping of the spindle in a defined position, the time required for this becomes an important factor in the throughput at such a machine tool. Therefore methods are already known which permit a spindle orientation as fast as possible, even at high numbers of revolutions. All these methods have in common that initially the high rotational speed is reduced under the control of a rotational speed controller until a rotational speed has been reached which can also be controlled by a position controller.

Thus, EP 0 580 866 B1 describes such a method for the orientation of a spindle. In accordance with this method, following the generation of a spindle orientation command, first the rotational speed is reduced to a threshold rotational speed N1 under the control of the number of revolution regulator, in that this threshold rotational speed is preset in the rotational speed controller. Only after this threshold rotational speed has been reached are parameters calculated, which subsequently under position regulation permit the desired position of rest to be approached on a time-optimized track.

The disadvantage of methods of this type lies in that, after reaching the threshold rotational speed at which the switching over from the rotational speed regulation to the position regulation is to be made, the spindle first must be operated for some time at the threshold rotational speed in order to perform the required calculations for switching over into position regulation. This means a considerable loss of time for the spindle orientation, since during this time no further braking of the spindle occurs. In connection with the known methods it is furthermore customary to switch over from maximum deceleration to a continuous rotational speed when reaching the threshold rotational speed. Because of this the first derivative with respect to time of the acceleration, the jerk, becomes very large, from which a high stress of the mechanical parts results.

OBJECT AND SUMMARY OF THE INVENTION

It is therefore an object of the present invention to disclose a method by which the time required for spindle orientation is reduced.

The above object is attained by a method for the orientation of a spindle of a numerically controlled and rapidly rotating spindle by which the spindle is brought from an initial rotational speed into a predetermined position of rest. The method includes performing a first phase of orientation of the spindle by braking the spindle to a threshold rotational speed, wherein during the braking a switching over to a position controller is prepared, the switching over is performed at a switching time during a transition from the first phase of orientation to a second phase of orientation, the switching over is continuous in regard to position and/or rotational speed, and wherein a rotational speed of the spindle drops strictly monotonically. The method further includes performing the second phase of orientation of the spindle so that a predetermined position of rest for the spindle is controlled by the position controller from the switching time until the predetermined position of rest of the spindle has been reached in the second phase at a position time.

A further object of the present invention is to disclose a numerical control device of a machine tool embodied for the method of the present invention.

The further object is attained by a numerical control unit for a machine tool that performs the method for spindle orientation of the present invention.

It is now proposed to decelerate a rapidly rotating spindle in a first phase from an initial rotational speed to a first threshold rotational speed, and to approach a defined position of rest in a second phase under position regulation. A switching over to the position controller which is continuous in regard to the position and/or rotational speed is already prepared in this first phase. Then, once the first threshold rotational speed has been reached, a switching over to the position regulation is made which is continuous in regard to the position and/or rotational speed, wherein a strictly monotonic decreasing rotational speed is maintained. Following the switching over to the position regulation, the spindle is brought into the defined position of rest.

The braking process in the first phase is performed particularly advantageously in that a maximum current and therefore a maximum torque is used for braking. In this case this torque can be greater than a torque permitted during normal operations would be, since such braking processes only occur once in a while and over short periods of time, so that an overload of the spindle drive mechanism need not be feared. For example, it is possible for braking the spindle at a first braking rate function so as to preset a nominal rotational speed of zero and to limit the current generated by a current regulator (which is proportional to the braking torque via the motor constant) only by a monitoring unit which monitors the temperature of the electronic drive unit and/or the spindle drive. In this way it is possible to prevent an overload of the spindle drive, but still to brake with maximum current. Because of this the first phase becomes as snort as possible.

Now, in order to make possible a switching over to the position controller, which is continuous in regard to the position and rotational speed, at all when the first threshold rotational speed has been reached, it is necessary to start the required calculations for switching already before the first rotational speed has been reached. So that sufficient time remains for this in the first phase, a check is first made to determine whether the initial rotational speed lies above a second threshold rotational speed which must be selected to be greater than the first threshold rotational speed. The length of time from reaching the second threshold rotational speed to reaching the first threshold rotational speed must be large enough for allowing the required preparations for switching to the position controller. Thus, the described method is only applied if the initial rotational speed lies above the second threshold rotational speed.

Finally, a jerk limitation can be provided in the calculation of the conditions for the position controller in the second phase. By this marginal condition and the position of the spindle and the number of spindle revolutions at the time of switching over, as well as the required position of rest, it is possible to calculate a track curve for the spindle which is optimal with respect to the shortest possible time.

Further advantages, as well as details, of the present invention ensue from the following description of a preferred method for spindle orientation by the drawings.

DETAILED DESCRIPTION OF THE PREFERRED EMBODIMENTS

Figure 1:
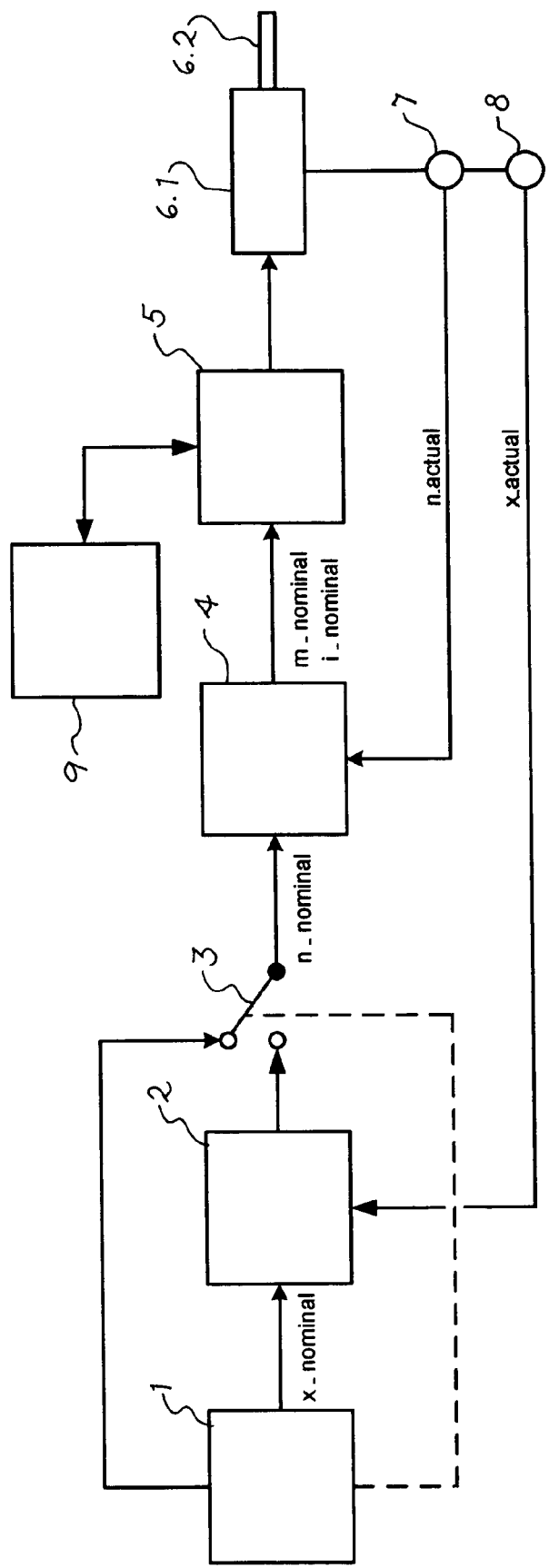
FIG. 1 schematically represents an embodiment of a device for controlling a spindle in accordance with the present invention.

FIG. 1 shows a device for controlling a spindle 6.2. A numerical control device 1 selectively outputs nominal position values x_nominal to a position controller 2, or nominal rotational speed values n_nominal to a rotational speed controller 4. Therefore the numerical control device 1 can be switched between position regulation and rotational speed regulation as schematically represented over by change-over switch 3. In the case of the numerical control device 1 being switched over to position controller 2, the position controller outputs a desired rotational speed of the spindle. In both switching over cases, the rotational speed controller 4 generates a nominal torque m_nominal or a nominal current i_nominal (the two nominal values are proportional with respect to each other via the motor constant) for the current regulator in the downstream connected electronic drive unit 5. The motor current set by the electronic drive unit 5 for the spindle drive unit 6.1 finally decides the acceleration of the spindle 6.2. A rotational speed sensor 7 and a position sensor 8 close the control loops, in which an actual rotational speed value n_actual and an actual position value x_actual are output to the rotational speed controller 4 or the position controller 2. It is of course also possible to obtain the actual rotational speed value n_actual by derivation from the actual position value x_actual.

To prevent an overload of the electronic drive unit 5, or the spindle drive unit 6.1, a parameter which limits the maximally permissible current is usually set in the numerical control device 1. It is possible in addition to provide a monitoring unit 9, which monitors the temperature of the electronic drive unit 5 and/or of the spindle drive unit 6.1 and which cause a limitation of the motor current, and therefore of the torque, in case of excessive temperatures.

The spindle 6.2 preferably is a directly driven spindle 6.2, however the described method or the described device can also be used with indirectly driven spindles 6.2.

The method which permits a more rapid spindle orientation in contrast to the prior art will now be described by FIGS. 2 and 3.

The starting point is a spindle rotating at a high initial rotational speed Ns, which is greater than a first threshold rotational speed Ng1. The initial rotational speed Ns is in particular so high that a position regulation is no longer possible since, because of the position regulation cycle of the numerical control device 1 per spindle revolution, the numerical control device 1 being not arbitrarily short, it is no longer possible to evaluate a sufficient number of position values of the position sensor 8 per spindle revolution. In accordance with the scanning theorem, the minimum requirement for position regulation is the evaluation of two position values per spindle revolution. With a position regulation cycle of 3 ms, which is typical for a numerical control device 1, a rotational speed of 10,000 rpm results, which can just be controlled by position regulation.

Therefore the first threshold rotational speed Ng1 should be selected to be lower than the rotational speed which can just be controlled by the position controller 2, since in accordance with the described method a switching over is made from rotational speed regulation (speed controller) to position regulation (position controller) when this first threshold rotational speed Ng1 is reached.

With the method described, deceleration or braking at a maximum torque and a first braking rate function is performed by rotational speed regulation in a first phase P1, which lies between the initial time Ts and the time T1 at which the first threshold rotational speed Ng1 has been reached. There is no sense in applying the described method if the initial rotational speed Ns lies only a little above the first threshold rotational speed Ng1, since a switching over, which is continuous in regard to the position and/or rotational speed, is prepared in a first step A still in the first phase P1. This preparation requires a certain amount of time, which would not be available if the initial rotational speed Ns lies too closely above the first threshold rotational speed Ng1. Therefore, the method is preferably started in a step A only if the initial rotational speed Ns also lies above a second threshold rotational speed Ng2. Otherwise customary methods will be employed for the spindle orientation.

Since in accordance with the described method a switching over, which is continuous in regard to the position and/or rotational speed, is made from rotational speed regulation to position regulation in a step B at the time T1, i.e. when the rotational speed of the spindle has reached the first threshold rotational speed Ng1, and in this way the second phase P2 is initiated, it is necessary to make a certain number of preparations in the numerical control device 1 already prior to the time T1. Thus, for a switching over which is continuous in regard to the position it is necessary to determine actual position values x_actual, which make possible an extrapolation of the spindle position at the time T1, at least at two times prior to the switching over. This extrapolated spindle position is required as the nominal position value x_nominal when the switching over to position regulation is made.

In the same way the determination of at least actual rotational speed values n_actual is required for a switching over which is continuous in regard to the rotational speed and which makes possible the extrapolation of the rotational speed at the time T1. This rotational speed is required as a pre-control value for the rotational speed controller 4 during position regulation. Additional outlay is required if a switching over, which is continuous in regard to acceleration, is also to take place. However, it has been shown during actual use that a small jump in acceleration can easily be tolerated. The large jerk occurring when the threshold rotational speed Ng1 is reached and which is disadvantageous in the prior art, is already avoided in that the deceleration is maintained during switching over, even though not necessarily altogether without an erratic change.

A certain amount of time is required for performing the said calculations, so that a length of time $\Delta T$ between reaching the second threshold rotational speed Tg2 (at the time T2) and the reaching of the first threshold rotational speed Tg1 (at the time T1) must not fall below this time. Furthermore, when selecting Ng2 it should be taken into account that the first phase P1 should at least be long enough so that the spindle 6.2 is braked with maximum deceleration. However, at the start of the phase P1 the deceleration is not yet maximal, which can be seen by the small rise of the curve in FIG. 2 shortly after the initial time Ts.

Therefore the second threshold rotational speed Ng2 must be selected such that the first phase P1 allows sufficient time for the necessary preparations for the switching over, which is continuous in regard to the position and/or rotational speed, from rotational speed regulation to position regulation in step B. Moreover, the first phase P1 should last at least long enough so that the spindle 6.2 reaches the maximum deceleration.

Thanks to the transfer values determined at the start, it is now possible in accordance with the described method to maintain a strictly monotonic failing rotational speed n during the switching-over in step B. It is not necessary, as in the prior art, to operate the spindle 6.2 for a certain length of time prior to switching over to position regulation at a continuous rotational speed, and therefore without deceleration, instead it is possible to brake continuously. The omission of a phase of continuous rotational speed provides a decisive time gain. Furthermore, the stress on the mechanical parts connected with the jump from maximum rotational speed to continuous rotational speed can be prevented to the greatest extent in case of a uniformly dropping rotational speed, and with a switching over, which is continuous in regard to acceleration, it can even be totally prevented.

A further time gain is achieved by braking with maximum current and therefore maximum torque in the first phase P1. This maximum current is generated in the simplest way in that a nominal rotational speed n_nominal of zero (or, if required, a very small value clearly below the first threshold rotational speed Ng1) is preset in the rotational speed controller 4 by the numerical control device 1. A nominal current i_nominal generated by the rotational speed controller 4 then will be large enough so that the spindle drive unit is braked at the current limit. It is of course also possible for the maximum current to be preset directly by the numerical control device 1 if the numerical control device 1 has an appropriate access to the current regulator in the electronic drive unit 5. However, in both cases the employment of a monitoring unit 9 is recommended, which monitors the temperatures in the electronic drive unit 5 and/or in the spindle drive unit 6.1 and limits the current in case of threatened overheating.

Up to now the first phase P1 of the method in accordance with the present invention has been described, including the measures required in step A in order to make a switching over in step B from rotational speed regulation to position regulation, and therefore into the second phase P2.

Figure 2:
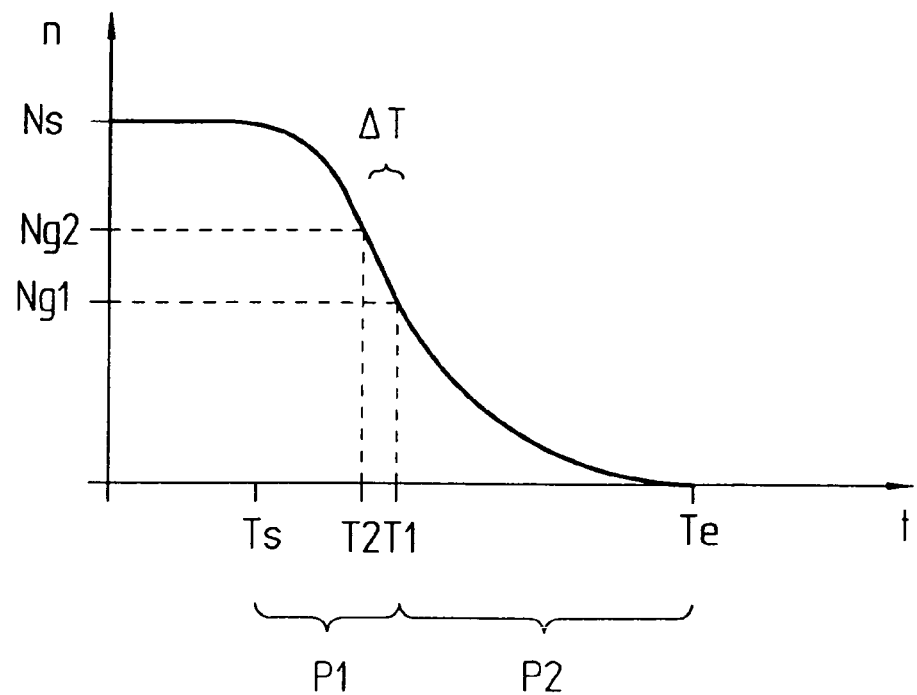
FIG. 2 is a possible rotational speed—time diagram of the spindle of FIG. 1.
Figure 3:
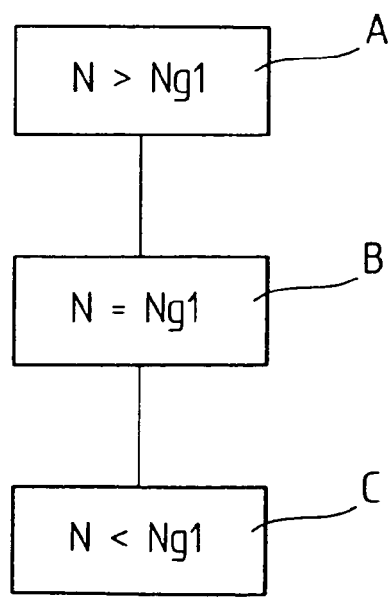
FIG. 3 shows a possible method for spindle orientation to be used with the device of FIG. 1 in accordance with the present invention.

In the second phase P2 (step C in FIG. 3) a second braking rate function is applied to the spindle 6.2 which is different than the first braking rate function as shown in FIG. 2. In the second phase, a movement profile is now calculated by the numerical control device 1, by which the nominal position values x_nominal can be issued to the position controller 2. A marginal condition for this movement profile is in every case the starting point of the movement, i.e. the position of the spindle at the start of the second phase P2 (time T1) and, with a switching over which is continuous in regard to the rotational speed, in step B also the rotational speed Ng1 at the time T1, as well as the defined position of rest of the spindle at the final time Te and the final rotational speed zero. It is optionally possible to parameterize a maximum jerk which, toward the end of the second phase P2, or also during the entire phase P2, limits the maximum jerk, or the maximum change of acceleration. Taking all marginal conditions into account, it is possible to calculate a movement profile which terminates the second phase P2 in the shortest possible time.

Besides the exemplary embodiments described, it is understood that alternative variants also exist within the scope of the present invention.

We claim:

1. A method for the orientation of a spindle of a numerically controlled and rapidly rotating spindle by which said spindle is brought from an initial rotational speed into a predetermined position of rest, the method comprising:
   performing a first phase of orientation of said spindle by braking said spindle at a first braking rate function to a threshold rotational speed, wherein during said braking a switching over from a speed controller to a position controller is prepared, said switching over is performed at a switching time during a transition from said first phase of orientation to a second phase of orientation, said switching over is continuous in regard to position and/or rotational speed, and wherein a rotational speed of said spindle drops strictly monotonically during said switching over; and performing said second phase of orientation of said spindle so that a predetermined position of rest for said spindle is controlled by said position controller from said switching time until said predetermined position of rest of said spindle has been reached in said second phase at a position time, said second phase of orientation having a second braking rate function different than said first braking rate function.

2. The method for spindle orientation in accordance with claim 1, wherein said braking at said first braking rate function is performed with a maximally possible current of an electronic drive unit that drives said spindle.

3. The method for spindle orientation in accordance with claim 2, wherein said maximally possible current is preset by a monitoring unit.

4. The method for spindle orientation in accordance with claim 3, wherein said monitoring unit monitors a temperature of a spindle drive unit and limits a current of said spindle drive unit when overheating is threatened.

5. The method for spindle orientation in accordance with claim 3, wherein said monitoring unit monitors a temperature of said electronic drive unit and limits a current of said electronic drive unit when overheating is threatened.

6. The method for spindle orientation in accordance with claim 1, wherein said braking at said first braking rate function is performed by presetting a small nominal rotational speed clearly below said threshold rotational speed in said speed controller.

7. The method for spindle orientation in accordance with claim 6, wherein said nominal rotational speed is zero.

8. The method for spindle orientation in accordance with claim 1, wherein a second threshold rotational speed above said threshold rotational speed is selected in such a way that a time period passes between reaching said second threshold rotational speed and reaching said threshold rotational speed, which permits said preparation of said switching over to said position controller, continuous in regard to said position or said rotational speed, from rotational speed regulation to position regulation.

9. The method for spindle orientation in accordance with claim 8, wherein within said time period at least two actual position values and/or rotational speed values are determined, which permit an extrapolation of a position and/or rotational speed of said spindle at said switching time from rotational speed regulation to position regulation.

10. The method for spindle orientation in accordance with claim 1, wherein nominal position values of said spindle for said second phase of orientation are preset in said position controller in such a way that a jerk-limited approach to said predetermined position of rest is caused.

11. The method for spindle orientation in accordance with claim 10, wherein a maximum jerk for said jerk-limited approach of said predetermined position of rest is preset.

12. A method for the orientation of a spindle of a numerically controlled and rapidly rotating spindle by which said spindle is brought from an initial rotational speed into a predetermined position of rest, the method comprising:

performing a first phase of orientation of said spindle by braking said spindle at a first braking rate function to a threshold rotational speed, wherein during said braking a switching over from a speed controller to a position controller is prepared, said switching over is performed at a switching time during a transition from said first phase of orientation to a second phase of orientation, said switching over is continuous in regard to position and/or rotational speed, and wherein a rotational speed of said spindle drops strictly monotonically during said switching over;

and performing said second phase of orientation of said spindle so that a predetermined position of rest for said spindle is controlled by said position controller from said switching time until said predetermined position of rest of said spindle has been reached in said second phase at a position time, said second phase of orientation having a second braking rate function different than said first braking rate function;

wherein a second threshold rotational speed above said threshold rotational speed is selected in such a way that a time period passes between reaching said second threshold rotational speed and reaching said threshold rotational speed, which permits said preparation of said switching over to said position controller, continuous in regard to said position or said rotational speed, from rotational speed regulation to position regulation; and wherein said method is only applied when said initial rotational speed lies above said second threshold rotational speed.

13. The method for spindle orientation in accordance with claim 12, wherein within said time period at least two actual position values and/or rotational speed values are determined, which permit an extrapolation of the position and/or rotational speed of said spindle at said switching time from rotational speed regulation to position regulation.

* * * * *